US006199615B1

(12) United States Patent
Klarl

(10) Patent No.: US 6,199,615 B1
(45) **Date of Patent: *Mar. 13, 2001**

(54) MACHINE FOR REMOVING WRAP-AROUND LABELS OR SHRINK-WRAPS FROM BOTTLES OR SIMILAR DEVICES

(75) Inventor: Heinrich Klarl, Thalmassing (DE)

(73) Assignee: Krones AG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,231

(22) PCT Filed: Jul. 30, 1997

(86) PCT No.: PCT/EP97/04129

§ 371 Date: Mar. 19, 1998

§ 102(e) Date: Mar. 19, 1998

(87) PCT Pub. No.: WO98/04367

PCT Pub. Date: Feb. 5, 1998

(30) Foreign Application Priority Data

| | | |
|---|---|---|
| Jul. 30, 1996 | (DE) | 196 30 690 |
| Oct. 7, 1996 | (DE) | 196 41 156 |
| Oct. 21, 1996 | (DE) | 196 43 403 |

(51) Int. Cl.[7] ..... B32B 35/00

(52) U.S. Cl. ..... 156/584; 83/924; 83/946

(58) Field of Search ..... 83/14, 18, 19, 83/42, 54, 53, 56, 176, 267, 352, 355, 373, 565, 601, 614, 627, 635, 24, 27, 48, 150, 155.1, 168, 171, 100, 113, 914, 924, 183, 402, 411.1, 555, 946; 156/344, 584

(56) References Cited

U.S. PATENT DOCUMENTS

| | | | | |
|---|---|---|---|---|
| 3,924,315 | * | 12/1975 | Cady et al. | 83/914 |
| 4,561,928 | * | 12/1985 | Malthouse | 83/113 |
| 4,922,775 | * | 5/1990 | Winter | 83/100 |
| 4,944,832 | * | 7/1990 | Abe et al. | 83/924 |
| 5,123,993 | * | 6/1992 | Wiggins | 156/584 |
| 5,317,794 | * | 6/1994 | Lerner et al. | 156/584 |
| 5,372,672 | * | 12/1994 | Seifert et al. | 83/18 |
| 5,478,434 | * | 12/1995 | Kerr et al. | 156/584 |
| 5,685,053 | * | 11/1997 | Deonarine et al. | 83/53 |

FOREIGN PATENT DOCUMENTS

| | | |
|---|---|---|
| 4219051A1 | 12/1993 | (DE) . |
| 19513221A1 | 6/1996 | (DE) . |
| 698424A1 | 8/1995 | (EP) . |
| WO95/32814 | 6/1995 | (WO) . |

* cited by examiner

*Primary Examiner*—M. Rachuba
*Assistant Examiner*—Melissa L Hall
(74) *Attorney, Agent, or Firm*—Tilton, Fallon, Lungmus & Chestnut

(57) ABSTRACT

The invention relates to a machine for removing circular labels or shrinkwrap from bottles or similar items. In order to achieve a simple and compact embodiment of such a machine, the cutting agents are set up in the intake section of the machine.

15 Claims, 4 Drawing Sheets

MACHINE FOR REMOVING WRAP-AROUND LABELS OR SHRINK-WRAPS FROM BOTTLES OR SIMILAR DEVICES

BACKGROUND OF THE INVENTION

1. Field of the invention

The invention relates to a machine for removing circular labels or shrinkwrap from bottles or similar items.

2. Description of the Related Art

A similar machine is known from the international patent application WO 95/32 814. This machine has a rotary table with cutting tools for cutting through the circular labels or sleeves and a separate chain conveyer to keep the bottles away from the floor. On the chain conveyer are blast nozzles for loosening the labels from the bottles.

BRIEF SUMMARY OF THE INVENTION

The object of the invention is to provide a compact machine that does not take up much space for removing the circular labels or shrinkwrap from bottles and similar items.

The object is achieved by providing for the circular labels or shrinkwraps a separating or perforated line at the feed part of the machine.

This solution has the advantage that the carousel of the machine can be used for loosening the labels or sleeves, and in this way the chain conveyer used by the generic machines can be left out without a substitute.

The carousel is designed, i.e., equipped, with appropriate holding mechanisms, so that the bottles can be held hanging by the area around the head free of the floor. The devices required to loosen the labels, e.g., the spray nozzles, are set up on the circular path of the carousel.

According to an advantageous embodiment of the invention, the cutting tools necessary to create the separating line or perforated line in the labels are set up in the feed wheel of the machine, or integrated into this.

Advantageous further developments of the invention are indicated in the subclaims.

Details of a preferred embodiment of the invention as shown in the figures are given below. The figures show the following:

DETAILED DESCRIPTION OF THE INVENTION

Figure 1:
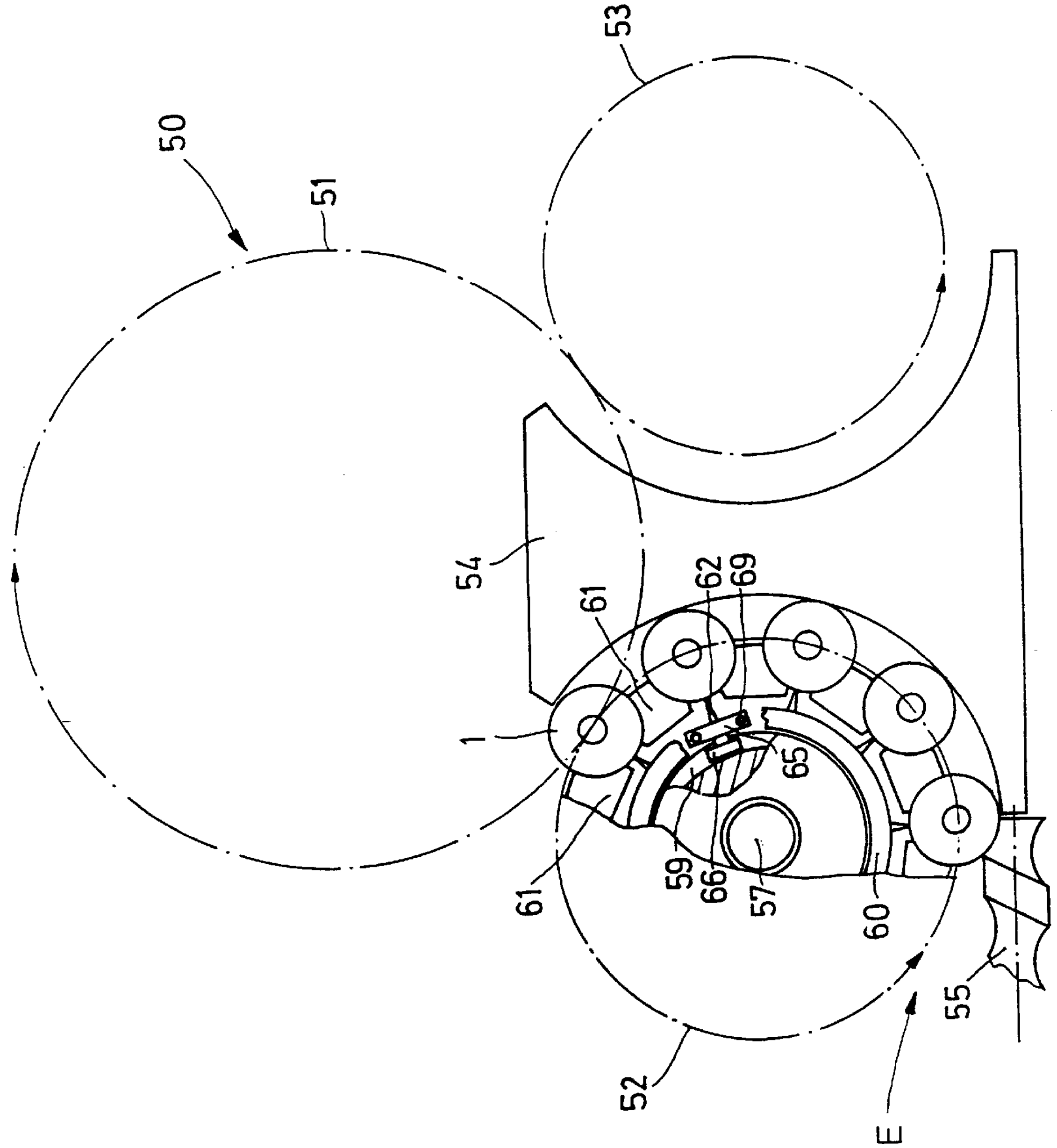
FIG. 1: a top view of a label-removing machine in diagrammatic representation.

As can be seen in FIG. 1, the label-removing machine 50 has a carousel 51, which has a feed wheel 52 and a delivery star wheel 53. The carousel 51 and the delivery star wheel 53 are indicated only with partial circles which touch each other at the point of transfer. Between feed wheel 52 and delivery star wheel 53 there is a guide section 54. Feed wheel 52 is provided with a tangentially directed distributor worm gear 55, and together with the feed wheel this forms the intake area E of the machine. The distributor worm gear 55, the feed wheel 52, the carousel 51, and the delivery star wheel 53 are driven synchronously.

As they pass through the circular segment of worm gear 55 up to the transfer point to carousel 51, the bottles 1 are transported glidingly into the feed wheel 52 on a transferring plate 56 that is stationary, while bottles 1 on the side opposite the feed wheel 52 are laterally supported and guided by guide section 54.

The feed wheel 52 has a power-driven shaft 57 (not shown in more detail) positioned vertically in the machine frame, and on this shaft a horizontal mounting disk 58 is mounted. Over the mounting disk 58 a cylinder 59 is positioned to rotate freely on the shaft 57; the cylinder 59 has a groove molded into its outer circumference, and is prevented from rotating by a torque prop. On one sector of the mounting disk 58 guide rods 69 are fastened in a vertical arrangement, and their upper ends are joined by a ring 60. In addition, the bottle centering attachments 61 on the mounting disk 58 can also be seen in FIG. 1.

Two adjacent bottle-centering attachments 61 together form a receptacle for a bottle 1. A vertical slot between any two adjacent bottle-centering attachments 61 is penetrated by a cutting blade 62, which is mounted at one end to swivel on a horizontal axis 63, and is loaded on its opposite end, containing the blade, by a compression spring 64 in the direction of the bottle wall. The aforementioned axis 63 is a bed plate 65 mounted to shift vertically in the slot of a pair of guide rods 69. On the side of the bed plate 65 with the shaft 57, a cam roller 66 is set up, engaging in the groove of the cylinder 59.

The shape of the groove is such that during a downward movement of bed plate 65, the cutting blade 62 with its tip comes from above between the upper label border and the bottle wall and cuts through the circular label 2 from the inside facing the bottle wall in the direction of the outer side, while a bottle passes through the circular segment of the distributor worm gear 55 up to carousel 51. According to the length of the circular segment available and the properties of the label material, the label can either be chamfered only on its upper edge or, if necessary, cut all the way through to the lower edge of the label.

Figure 4:
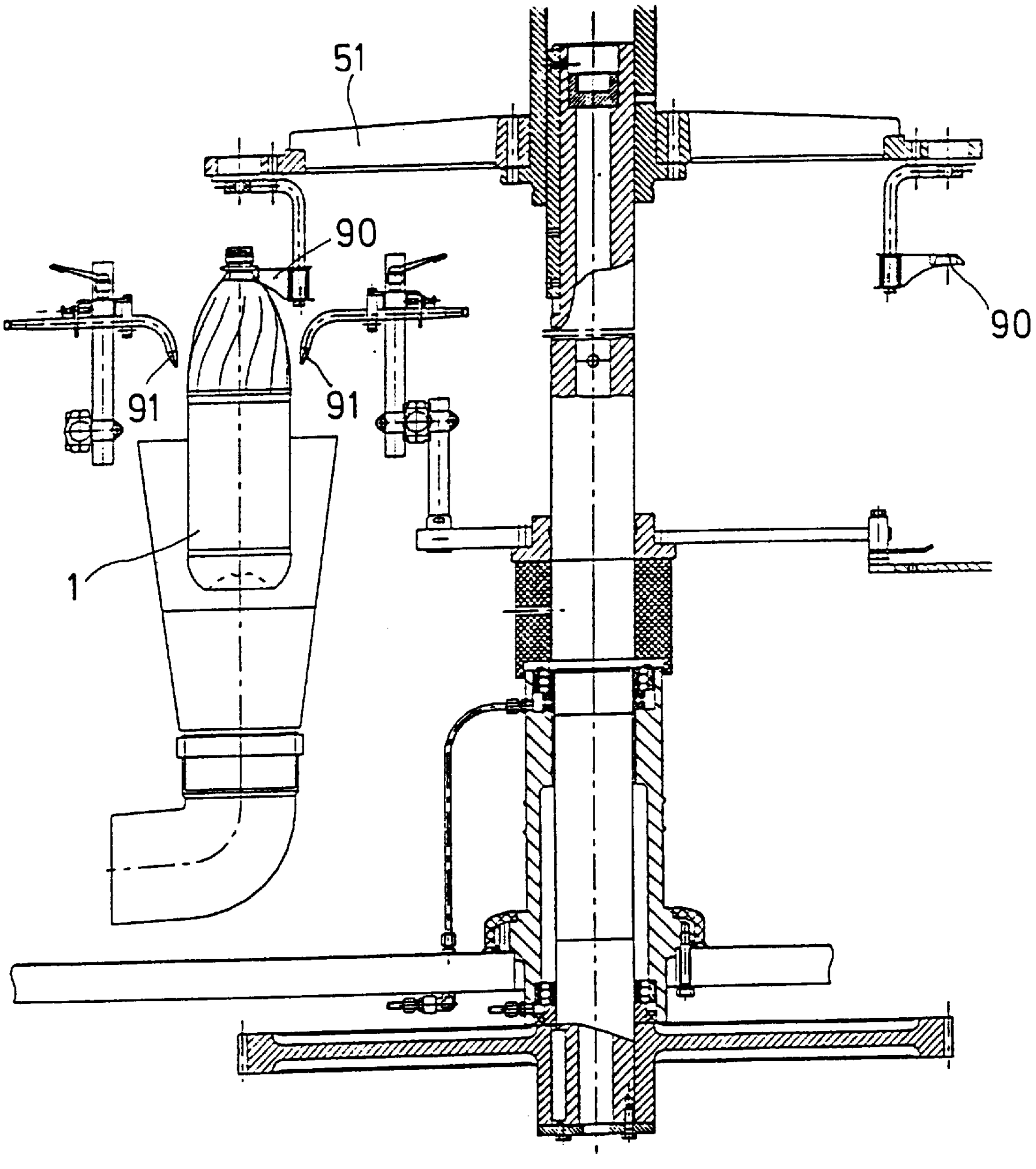
FIG. 4: a vertical section through the carousel of the machine according to FIG. 1.

An important factor is that a predetermined breaking point is created on the circumference of the circular label 2, that subsequently, when the bottle passes through the carousel 51, makes it possible for the label to be blown away by fluid jets, e.g., compressed air jets. For this purpose, bottles 1 are gripped beneath the mouth at the neck when they are transferred from the feed wheel 52 to carousel 51, by elastic clamps 90 that encircle the carousel 51, and hanging free of the floor, they are guided past spray nozzles 91, which release, obliquely from above, jet streams essentially directed axially to the bottle wall onto the upper edge of the label, (FIG. 4). The spray nozzles 91 are mounted stationarily on the circumferential edge of the carousel.

As a variant of the previously described embodiment, in place of the cutting blades 62 mounted at each receptacle, a high-pressure water jet or a laser beam can be used. A laser light source can be positioned advantageously on the feed wheel 52, when the laser beam can be guided, by means of a controllable mirror, e.g., a vibrating mirror, appropriately for the bottle movement, for a short period, for cutting the label material. Instruments for creating a perforated line in the label material can also be used.

Figure 3:
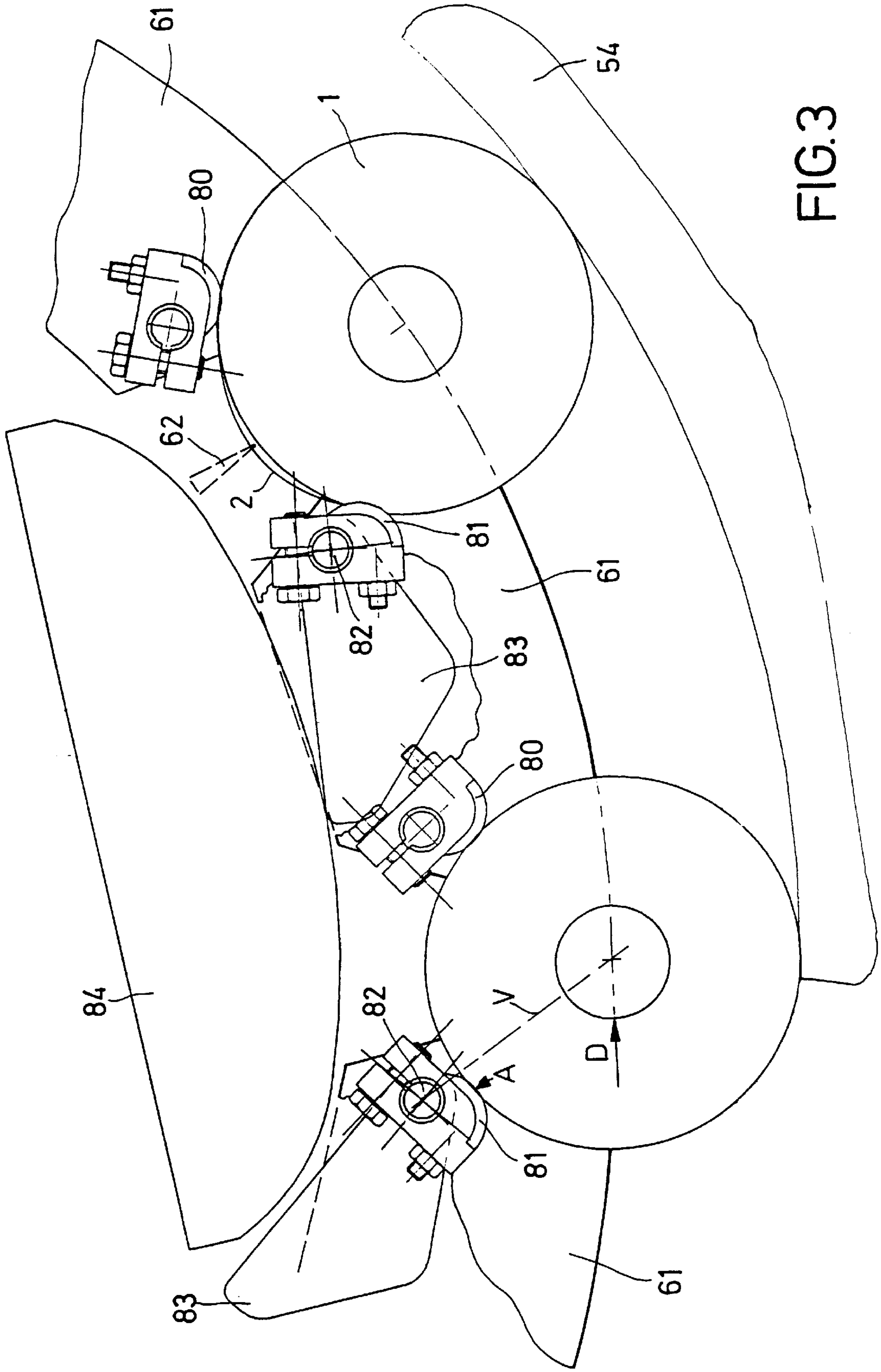
FIG. 3: a top view of a section of the periphery of the feed wheel of the machine according to FIG. 1, in enlarged view.

FIG. 3 shows a further development of the feed wheel 52 from FIG. 1, and here only a small section of the upper periphery of the feed wheel 52 is shown in an enlargement of the region of the distributor worm gear 55 (FIG. 1).

On the upper side of the centering attachments 61 forming the receptacles for the bottles 1, two cams 80 and 81 are set up. The cam 80 forwarding a bottle 1—seen in the rotary direction D of the star wheel—is rigidly clamped to a bolt, while the following cam 81 is clamped on a shaft 82, set up to rotate vertically on the centering attachment 61; the lower end of the shaft 82 protrudes from the mounting disk 58 (not shown in FIG. 2). A control lever 83 is fastened to this lower end of the shaft 82 (FIG. 3); during operation, the lever circulates together with the power-driven mounting disk 58 and thereby, in the area of the distributor worm gear 55 (FIG. 1) engages in a cam 84 (FIG. 3) set up rigidly on the mounting disk. Cam 81 equipped with a gripping rubber lining is swivelled in a counterclockwise direction toward the cutting blade 62 by the radial cam 84 lying inside the circular path of the control lever; in this way the cam 81 lies against the label material with frictional contact and lifts it from the bottle wall in sections during the swiveling movement. The second, uncontrolled cam 80, positioned on the opposite side, prevents rotation of the label around the body of the bottle during this rotary movement of cam 81, so that the label forms a loop for the cutting blade 62 between the cams 80 and 81.

Figure 2:
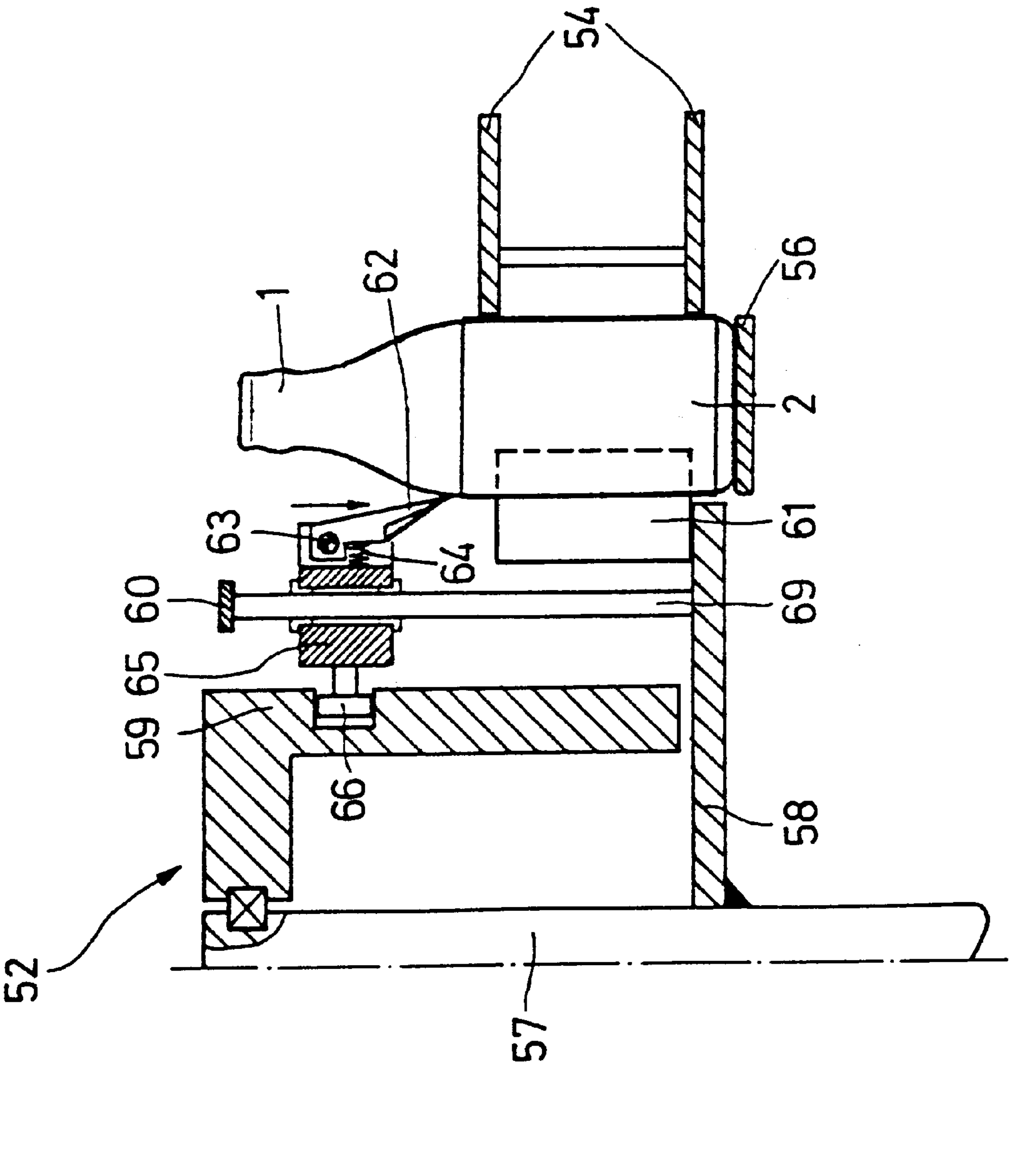
FIG. 2: a vertical section through the feed wheel of the machine according to FIG. 1.

The point of attack A of the swiveling cam 81, at the beginning of the swiveling movement, lies in front of the imaginary line V connecting the control lever axis of rotation of the shaft 82 and the vertical axis of the bottle, or on a plane formed between these two axes. During the swiveling motion of the cam 81, the side wall of a flexible bottle, e.g., PET bottle, is radially curved. Immediately after the cessation of the cam swiveling movement, the cutting knife 62 positioned between the two cams 80 and 81 assigned to the bottle 1 is lowered and thereby, as shown in FIG. 2, introduced from above between the bottle outside wall and the back side of the label. During this activity, in addition, air sprays can be directed from above (not shown) onto the upper edge of the label, in order to assist in the removal of the label border from the bottle wall.

For viscous elastic label materials, the cutting movement of the cutting blade 62 can be continued down to the lower label border, i.e., the label is completely cut through. Cams 80 and 81 prevent the axial sliding of the circular label downwards, especially when there is no glue or only a small amount of glue between a label 2 and a bottle 1.

What is claimed is:

1. A machine for removing circular labels or shrinkwrap from bottles, comprising in combination: a carousel for conveying the bottles in the machine and a feed wheel for transferring said bottles from an intake section of said machine to said carousel, wherein said feed wheel has cutting tools to create a separation line or perforated line in said label material during conveyance from said intake section to said carousel and said carousel includes means for holding said bottles and means for removing said label material from said bottles.

2. A machine according to claim 1, wherein said feed wheel has receptacles regularly arranged around its periphery, and said cutting tools are set up on the radial inner side of an bottle orbit in said feed wheel.

3. A machine according to claim 2, wherein each receptacle has its own said cutting tool affixed thereto, and wherein said receptacle and said affixed cutting tool can be moved perpendicularly in a circular segment of the bottle rotating plane in said feed wheel.

4. A machine according to claim 2, wherein said receptacles comprise holding devices for the bottles.

5. A machine according to claim 1, wherein said cutting tools are selected from a group consisting of knife blades, laser beams, and high-pressure water jets.

6. A machine according to claim 1, wherein, toward the portion of the label exposed to said cutting tool, a fluid jet is directed for lifting the label edge from the outside wall of the bottle, and said cutting tool is introduced between said label and outside wall of the bottle.

7. A machine according to claim 1, wherein lifting devices for frictionally gripping the label material are correlated with said cutting tools.

8. A machine according to claim 7, wherein at least one of said lifting devices can be operated so that the area of the label border exposed to said cutting tool can be lifted at least slightly from the bottle outside wall, and said cutting tool can be guided at this point between the label and the outside wall of the bottle.

9. A machine according to claim 7, wherein each of said lifting devices is designed as a gripping cam.

10. A machine according to claim 9, wherein each pair of gripping cams grips a label on a bottle, and further wherein at least one said gripping cam can be swivelled around an axis essentially parallel to the longitudinal axis of the bottle.

11. A machine according to claim 10, wherein in each said receptacle of said feed wheel a pair of said gripping cams (80, 81) are mounted with a mutual space between them, at least one of said two cams, during or after the introduction of a bottle into a receptacle, can be rotated in the direction of said cutting tool.

12. A machine according to claim 11, and wherein said at least one of said two cams is rotated controllably by a control lever, which is mounted to rotate along with said swiveling cam, and by a stationary radial cam on the rotating path of said feed wheel.

13. A machine according to claim 1, wherein there is a point of transfer at which said rotating feed wheel touches a carousel, said carousel being equipped with said means for removing the labels.

14. A machine according to claim 13, wherein said carousel is equipped with elastic holding clamps set up on the rotating arc of said carousel for the purpose of keeping the bottom of each of the bottles free.

15. A machine according to claim 13, wherein said devices for removing the labels comprise fluid jets essentially obliquely directed axially onto the edge of a label.

* * * * *